Nov. 23, 1971  LUIGI BERTRANDI  3,621,533
APPARATUS FOR PRODUCING RUBBER AND LIKE MOLDED ARTICLES
Filed Oct. 28, 1968  5 Sheets-Sheet 1
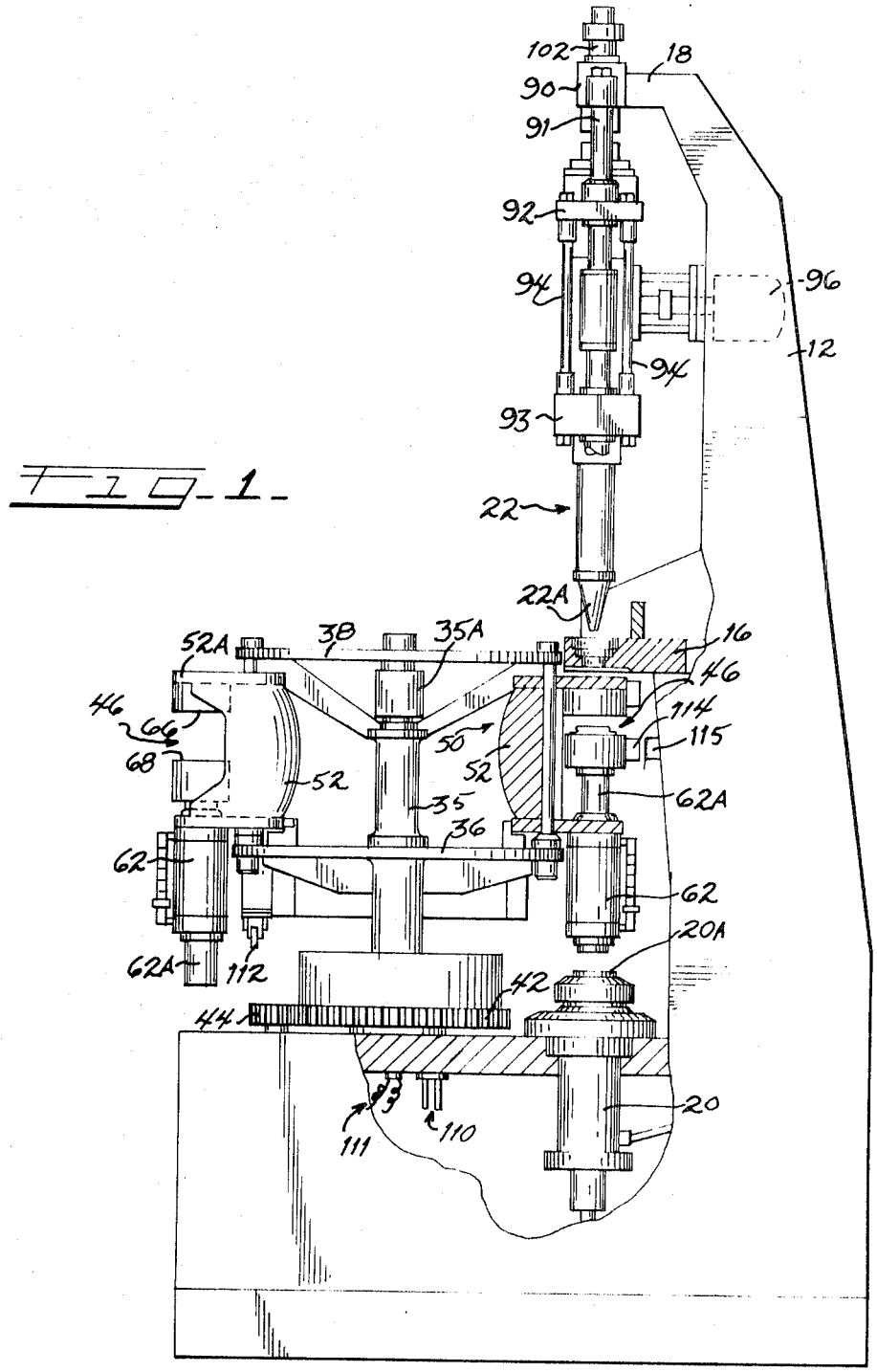
INVENTOR
LUIGI BERTRANDI
ATT'YS.

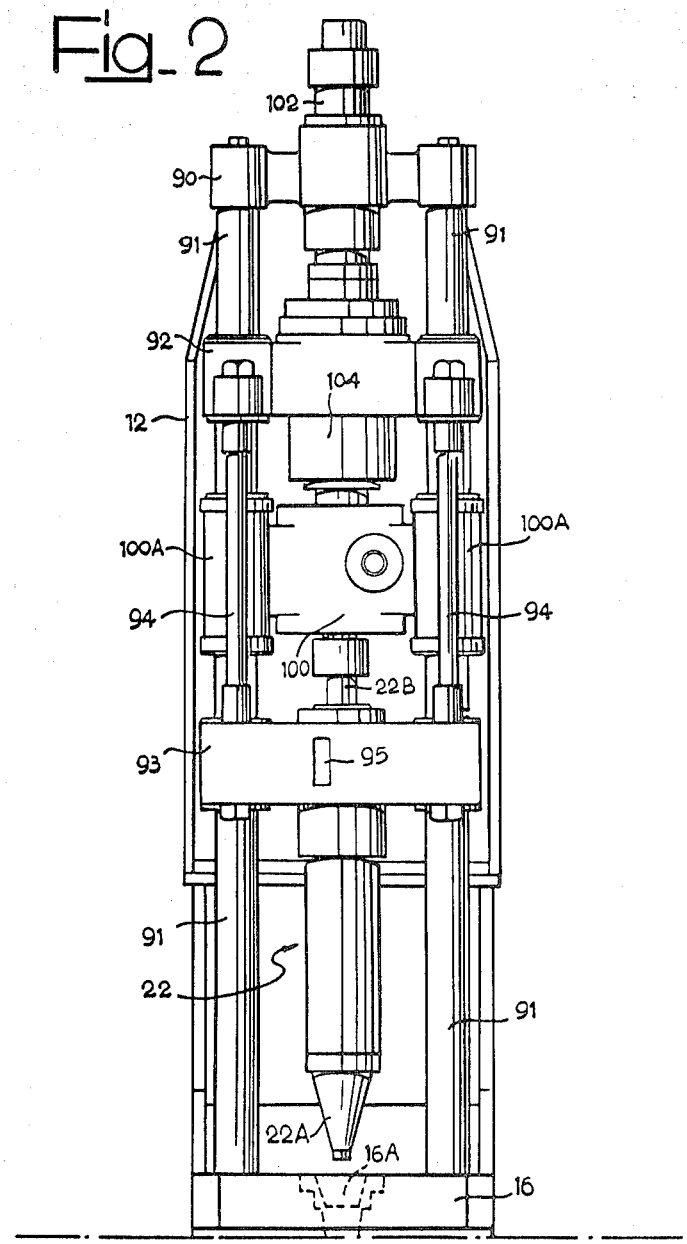

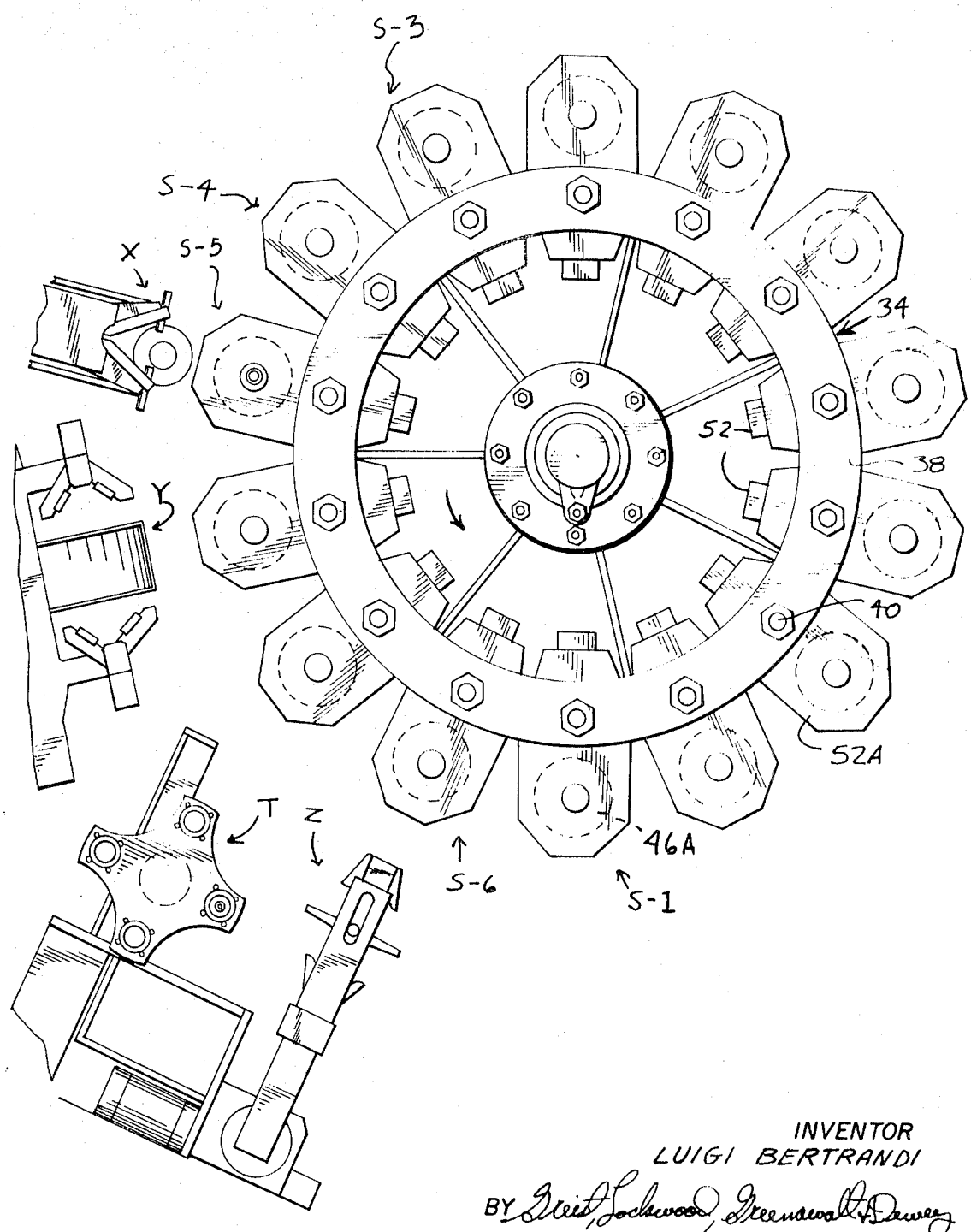

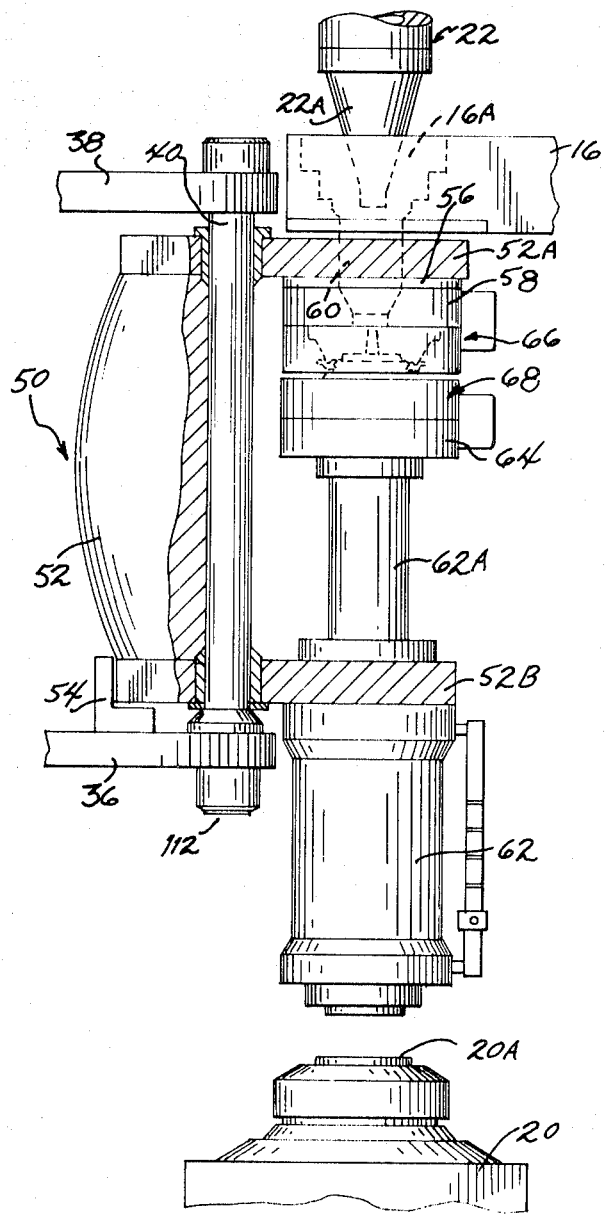

Nov. 23, 1971   LUIGI BERTRANDI   3,621,533
APPARATUS FOR PRODUCING RUBBER AND LIKE MOLDED ARTICLES
Filed Oct. 28, 1968   5 Sheets-Sheet 5
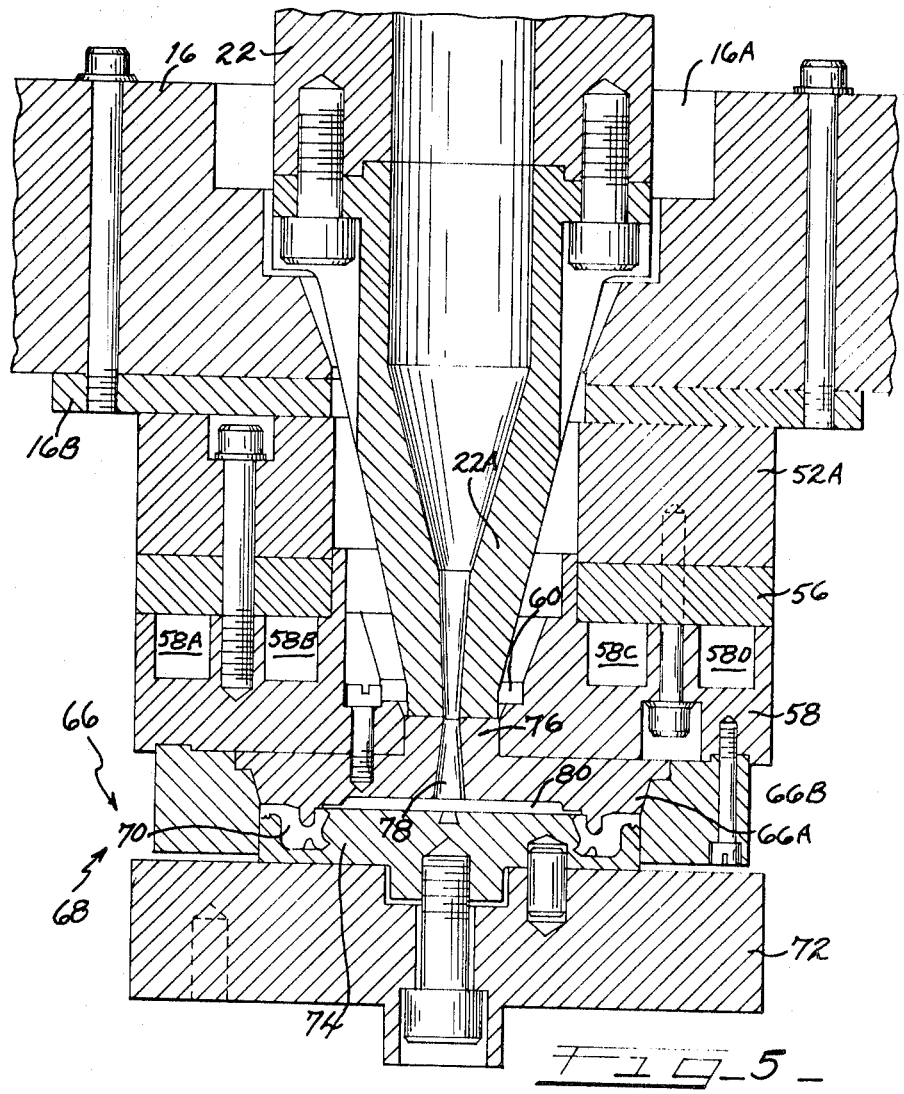
FIG_5
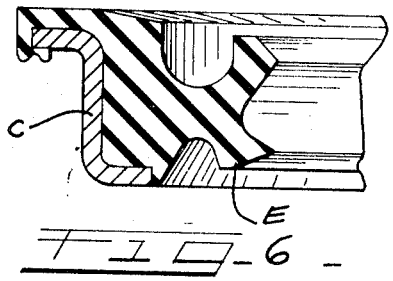
FIG_6
INVENTOR
LUIGI BERTRANDI
BY
ATT'YS.

United States Patent Office 3,621,533
Patented Nov. 23, 1971

3,621,533
APPARATUS FOR PRODUCING RUBBER AND
LIKE MOLDED ARTICLES
Luigi Bertrandi, Via Peano 11, Turin, Italy
Filed Oct. 28, 1968, Ser. No. 771,059
Claims priority, application Italy, Nov. 2, 1967,
53,577-A/67
Int. Cl. B29c 3/00
U.S. Cl. 18—20 H                                    10 Claims

ABSTRACT OF THE DISCLOSURE

An apparatus which includes a plurality of molds which open and close, means for closing the molds, for holding them closed under a first pressure or force, and for moving them into registry with a clamping station where a second, much greater force or pressure may be applied, while a charge of article-forming material is forced into the molds, one at a time, as they are brought into position, and means for maintaining the lower force on the molds after the material has been introduced into the molds, whereby only one high force cylinder assembly is needed for a plurality of molds, since each mold requires a high force to remain closed only during a short period within a molding and vulcanizing cycle. The process is particularly described with respect to a hydraulically operated machine in which molding is by way of injection of rubber into mold units mounted on a turntable so as to permit free but limited axial movement, to simplify operation of the clamping and high force-applying steps, and continuous operation.

BACKGROUND OF THE INVENTION

The above invention concerns the molding and vulcanization of articles, such as injection molding of rubber or partially rubber parts, in particular, mass-produced articles, such as well-known sealing rings of the type with a lip, for various hydraulic or like apparatus requiring oil seals.

Such articles at present must usually be made using revolving machines, consisting of a single injection device, and a circular rotating unit of die-assemblies, arranged so that each set of dies comes around successively to the injection station to be served by the injection unit. Time is allowed between two consecutive passages of the same group through the injection station for completion of the vulcanization processes, the delivery, and the preparation of the dies for the next injection (for example, spraying with a varnish to remove any residue, insertion of possible metal plates, casings or stampings, etc.).

Since, as the state of technical knowledge in this field shows, as long as vulcanizaton is not completed the dies must be held closed with considerable clamping pressure or force (in the order of $10^2$ tons) all the sets of dies mounted on the rotating unit each comprise a correspondingly powerful hydraulic unit or mechanism to close and clamp the dies shut. From this it is known that even with only 7 or 8 die assemblies, the rotating unit may typically weigh about ten tons, not only because of the combined weight of each assembly, but also because almost all the mass is concentrated on the periphery of the rotating unit, and requires, therefore, a correspondingly sturdy framework of reciprocal linkage in a single rigid unit. On the other hand, since the rotating unit is put into motion step by step, starting and stopping its inert mass, in the exact position of the injection at any step, requires powerful and sturdy mechanisms of control and braking to this is added, obviously, a high consumption of energy to turn the rotating unit step by step.

Thus, for example, with only 7 or 8 die-assemblies, production is slow: for an economically reasonably productive rate 12 to 14 die assemblies may be necessary, but in such a case the shortcomings already mentioned above would become prohibitive, especially from the point of view of cost, weight and space.

One of the principal objects of the present invention is therefore to provide an apparatus such as a press, for injection, transfer or like molding and vulcanization of rubber articles, which are substantially free from the inconveniences cited above and which therefore allow a fast production rate with a minimum requirement of weight and power.

A more particular object of the present invention is to provide a press of the type described above, which includes a relatively high number of die assemblies, in a rotating unit, but in which the weight and the inert masses are reduced up to 70 or 80 percent in relation to the machines at present in common use (and which are not believed to have reached the production rate of the press described in this invention). Further objects and advantages will appear more fully or be inherent in the description which follows.

Although the reasons for the success of the present invention are not necessarily a part of the invention, and the inventor does not wish to be bound by any particular theory it is believed that the invention is particularly based on two principles. The first discovery is apparently somewhat contrary to the principles (until now accepted) of molding and vulcanization of rubber articles in a mold which can be opened. It is found, in fact, that with regard to the clamping pressure $F_i$ of the die in the injection phase, the clamping pressure of $F_v$ in the vulcanization phase can be notably reduced (for example, to about one tenth of $F_i$ and even less) if the rubber compound is drawn upon entry into the molding cavity in such a way as to rise to near the vulcanization temperature, even before external heat is applied to the molding cavity of a type and duration sufficient to vulcanize rubber articles or rubber portion of an article.

Proceeding thus, the volume of the compound injected into the moulding cavity will therefore no longer present such a strong tendency to expand in the vulcanization phase, which has up until now required the application to the die, during such a phase of vulcanization, of a clamping pressure or force amounting to 100 tons or more; there only exists a residual tendency which may be counterbalanced by a very limited clamping pressure. For example, referring to sealing rings with lips, of a diameter of 60 to 70 mm., while, in the injection phase, the clamping force or pressure required amounts, in a typical case, to about 100 tons, the above mentioned residual tendency to expansion in the vulcanization phase can be counterbalanced by a clamping pressure of a mere 5 to 6 tons.

This first discovery therefore makes it feasible to use, a press with a rotating unit, which has relatively small and light closure cylinders mounted on the revolving unit and a single powerful clamping cylinder in a fixed position above the injection axis, and in opposition to the injector. A press of this type has already been proposed for the injection moulding of articles made from synthetic thermoplastic resins. However, because of the disadvantages already referred to (expansion of the compound in the vulcanization phase) the use of such an early press for moulding and vulcanization of rubber articles, was considered contrary to known principles. On the other hand, even such known presses were made in such a way as to render them practically impossible for use in the present invention, that is, except for that technique in which a thermo-plastic resin is injected in a heat-softened state into a mold, and in which this mold is cooled (with a consequent withdrawal of heat from the resin contained in it). In fact, in the first place, the structure of a press such as noted earlier offers no possibility for the application of the clamping pressure $F_1$ of the order required for the field of rubber without requiring a heavy massive structure, which the present invention proposes, on the contrary, to avoid. Secondly, such a construction was also inevitable, since, in order to produce rubber articles at an acceptable production rate, the number of die-assemblies of the revolving unit must be increased considerably: this fact (not a problem in the case of thermoplastic resins) constitutes a substantial obstacle to the objects of the present invention, taking into account the above mentioned clamping pressure $F_1$ in the injection phase. One of the elements which makes up the present invention consists, however, in a modification of the structure and in the working conditions of the press noted before and mentioned above, a modification without which the use of such a press would remain completely confined to the field of thermoplastic resins and inoperative for the purposes described herein.

Accordingly, the present invention provides an apparatus for injection molding and vulcanization of rubber articles characterized by the use of a press with a rotating or turntable unit, having the closure cylinders of the dies mounted on the revolving unit, and a single hydraulic clamping cylinder placed above the axis of injection and in opposition to the injector, and in which, moreover; (a) the rubber compound is drawn at its entry into the moulding cavity in every die in such a way as to be raised to near the vulcanization temperature; (b) the clamping pressure generated by the clamping cylinder is exerted on the mold but is resisted by the frame of the press rather than the turntable unit or the closure cylinders.

The present invention typically consists of a press with a rotating turntable unit for injection moulding and vulcanization of rubber articles of the type comprising a rotating unit of die-assemblies, with respective hydraulic or like fluid-operated closure cylinders, and in a fixed hydraulic clamping cylinder mounted on the injection axis in opposition to an injector, further preferably characterized by the fact that each of the die-assemblies is mounted on the revolving unit in sliding fashion along the axis of injection, under the thrust of the clamping cylinder on the piston rod of the respective closure cylinder, against a stopping gear which unloads the clamping pressure directly onto the frame.

In this fashion, therefore, in effect, the rotating unit of the press, according to this invention, can be made with a relatively light structure, and also, the increased number of die-assemblies which is necessary for the execution of the vulcanization phase at a fast production rate since the only relevant stress (clamping pressure $F_1$) is made to function in an area quite external to the turning unit, which, on the other hand, because of the construction above mentioned, each closure of the dies is required to generate, in the vicinity of the turning unit, only the clamping pressure necessary to counterbalance the residual tendency towards expansion which was mentioned in the preceding paragraphs, and introduce, therefore, considerably limited weight and dimensions. In fact, in a press along the lines of this invention, to produce sealing rings with lips, the turntable unit weighs scarcely 1 or 2 tons, for example, as opposed to 8 or 10 tons in the press with a rotating unit used at the present time for this purpose. In addition, the hourly productive capacity in a press made according to the invention, is superior by at least 30 percent.

Further objects and advantages of the invention will become more clearly apparent from the detailed description which follows, and by reference to the accompanying drawings, in which:

FIG. 1 is a side view in elevation, and partly in section, of a press made according to this invention;

FIG. 2 is an enlarged frontal partial view corresponding to the lines II—II of FIG. 1;

FIG. 3 is a top plan view of the rotation of turntable unit;

FIG. 4 is a side elevational view with portions broken-away of a die-assembly in closed position, but not clamped;

FIG. 5 is a partial axial section of a die-assembly in the injection position.

FIG. 6 is an enlarged sectional view of a portion of a seal made in the die assembly of FIG. 5.

The frame of the press as illustrated comprises a base 10 and a sturdy encased stanchion or backbone 12 which has three sturdy brackets 14, 16, 18, vertically aligned and spaced from one another. In an opening in the lowest bracket 14 is mounted, on a vertical axis, the hydraulic clamping cylinder 20 which has a piston rod 20A and the function of developing a clamping pressure or force in the order of about 100 tons. Since as will be seen following this, this clamping pressure in its functioning puts a stress on the intermediate brackets 16, the brackets 14 and 16, and the part of the backbone 12 contained between them must be sufficiently sturdy to resist such stress without any damaging deformation.

The intermediate bracket 16 has an opening 16A (FIG. 4) aligned with the piston rod 20A for the point 22A of an injector 22, which is also being aligned with the rod 20A.

The axis of alignment is indicated with an X, and it will hereinafter be called the "injection axis." Opposite the lower bracket 14 is fixed into the base 10 a stand 30 with a vertical shaft 32, which is adapted to revolving the rotating unit or turntable 34, which in turn comprises a hub 35, a disc 36, forming the base of the hub, a flat ring 38, and on the circumference, a uniform series of fourteen cylindrical posts, rods or columns 40, connected rigidly to the disc 36 and the ring 38 to form a structure sometimes referred to as a squirrel cage. Forming an integral part of the disc 36 is an advancement gear 42, cooperating with the pitch advancement device 44 fixed to the stand 30; at every operation of the device 44 the rotating unit 34 must rotate an amount corresponding to that of the column, that is by an angle equal to 360°/14.

On each column 40 is a vertically sliding die assembly 46 comprising self-contained means of closure, of opening, and of vulcanization. More precisely, each of the assemblies 46 comprises (FIG. 4) a ram 50 of the following pattern, comprising a body 52 with two arms 52A, 52B, perpendicular to the column 40. The body 52 is slidable on column 40 for free but limited vertical movement, but is prevented from rotating inside this by a hub insert slide 54, forming an integral part of the disc 36, which fixes the slide 50 in a given or predetermined angular position in which the arms 52A, 52B extend out radially beyond the perimeter of the ring 38 and the disc 36 of the rotating unit. The two opposite faces, upper and lower, of the arm 52A are flat and perpendicular to the column 44 (and, in the embodiment shown, also to the injection axis). To the lower face is fixed, with the interposition of high temperature resistant plate 56, a metal heating plate 58 presenting a system of grooves 58A, 58B, 58C, 58D (FIG.5) in which are placed conventional electrical heating registers (not illustrated). The arm 52A and the plates 56 and 58 are bored in the center to receive, in the injection position, the point 22A of the screw injector 22. More exactly, as is seen in FIGS. 1 and 4, the ring 38 is found exactly at the level of the intermediate bracket 16, and the upper arms 52A of the slide 50 are found at a lower level (e.g., of 0.5 cm.) in relation to the said brackets. With any stopped position of rotation that the turntable unit 34 makes by a movement of the gear 44, the arm 52A of a slide is brought to a position below the bracket 16, in which the hold 60 (FIG. 4), crosses the arm 52A, and the plates 56 and 58 are co-axial with the injection axis X and can receive the point of the injector 22 as stated above.

The lower arm 52B of the slide 50 carries the hydraulic closure cylinder 62, rigidly fixed to the lower face of the arm 52B and whose geometrical axis coincides with the injection axis X when the slide reaches the position described in the preceding paragraph; in such a position, the closure cylinder is found, directly opposite the piston rod 20A of the clamping cylinder 20 (FIG. 4). The piston rod 62A of the closing cylinder extends out beyond both the ends of the latter and terminates at the upper end thereof in a die-carrying plate 64 extending perpendicular to the axis of the rod 62A. The closing cylinder is constructed in such a way as to develop a pressure far less than that which can be developed by the clamping cylinder 20. In effect, the relation between the two pressures does not exceed 1:5 and in the majority of cases is quite below 1:10. However, such limits are merely illustrative.

On the lower face of the heating plate 58 of every die assembly is fixed, in a replaceable manner a die 66; in the same way, to the upper face of the plate 64 is fixed a counter die 68. In the function shown, it is supposed to mold standard oil seals of the type with a sealing or exclusion lip. The die 66 comprises, therefore, a downwardly directed upper component 66A (FIG. 5) and a frame 66B, both bolted onto the heating plate 58 and jointly forming a part of the angular molding cavity 70 of the ring washer; the counter die 68 comprises, on the other hand, a base plate 72 to which is bolted an upwardly directed lower die component 74, partially forming the molding cavity 70. The upper component 66A has a reduced diameter nose portion 76 which extends slightly into the central bore 60 of the heating plate, in registry therewith, and the nose 76 is traversed axially by the injection opening 78. A metal stamping C (FIG. 6) shown with a rubber seal element E branded thereto, is disposed within the cavity 70. A flat distribution channel 80 communicates therewith, and is formed between the components 66A, 74 of the dies. The distribution channel 80 communicates only along its perimeter with the moulding cavity 70 through a narrow annular passage 82 of greatly reduced cross-sectional area relative to the area of the channel 80. For example, for an oil seal having an internal diameter on the order of 60 to 70 mm., the thickness of the passage 82 is of the order of 0.15 to 0.20 mm. (0.006–0.008 inch).

The screw injector 22 is of the standard type, suitably adapted to the structure described above. Thus, referring now to FIGS. 1 and 2, to the upper bracket 18 of the backbone 12, a cross-member 90 is rigidly fixed, between the end of which and the intermediate brackets 16 are two vertically extending guide columns 91. On these two columns 91 are two further cross pieces 92, 93, spaced apart from one another and at the same time rigidly fixed against lateral movement by four rods 94. The main shaft of the screw injector 22 is rigidly supported by the lower free sliding cross piece 93, containing the aperture 95 of the injection feed. The screw-piston (of which the shank is numbered 22B in FIG. 2) is made to rotate by a hydraulic rotary motor 96 (FIG. 1) through a reduction box 100, placed between the guide columns 91 and free running on these by means of slide bearings 100A.

On the upper free sliding cross piece 92, a device for raising and lowering the injector operates, and this device comprises a double acting hydraulic cylinder 102, of which the piston rod is operatively fixed to the said cross piece. In this way the injector 22 can be brought selectively to the completely raised position (FIG. 2) in which the point 22A is withdrawn from the opening 16A in the brackets 16, and to the completely lowered position (FIG. 5) in which the point 22 is applied and held against the hub 76 for the execution of the injection.

The shank 22B of the screw piston of the injector passes through the reduction box 100, and is operatively coupled to the piston rod of a further hydraulic double acting cylinder 104, rigidly supported by the free sliding cross piece 92. The cylinder 104 normally holds the screw piston in its withdrawn position; for every turn that a die-assembly 50 makes on the injection axis X the hydraulic cylinder 102, for the movement of the injector, lowers this latter to the position of FIG. 5, after which the cylinder 104 thrusts the screw piston downwards to effectuate the injection, as is well known to those skilled in this technique. Once the injection has been performed, the cylinder 104 draws the screw upwards while the whole injector is drawn back to the raised position (FIG. 2) of the cylinder 102.

The hydraulic and electrical circuits of the press described above are constructed according to well known ideas, so that it is not necessary to illustrate them in detail, except for some explanatory reference in the paragraph which follows, in which is described the functioning or operation of the press.

In FIG. 3, a die-assembly (numbered 46A) is halted at the injection S–1 where the assembly is aligned on the axis X with the injector 22. It is presumed that the injection is completed and that the injector is returning to the position shown in FIG. 2.

With reference to FIG. 3, it is presumed that a die-assembly (indicated by 46A) has just arrived at the injection point S-1 in alignment with the axis X of the injector 22, the latter being in a withdrawn position (FIGS. 1 and 2). The die-assembly is already closed, following the action of its closure cylinder 62 and a quantity of the elastic vulcanizable, article-forming compound, in a softened state, is already disposed in the point 22A of the injector 22.

At this point, the clamping cylinder 20 comes into action, the piston-rod 20A of which raises itself, towards the lower end of the piston-rod 62A of the closure cylinder 62, and raises the die-assembly in question along column 40 until it comes to a stop against the intermediate bracket 16. (To avoid damage to the latter, its lower face is protected by a hardened plate (16B in FIGS. 4 and 5) to absorb stress and impact). With this, all the clamping pressure (100 tons or more) is absorbed in the area of the backbone 12, without in any way stressing the turntable 34. With the raising of the rod of the clamping cylinder 20, the downward movement of the injector 22 is released following the action of the cylinder 102, until the position of injection shown in FIG. 5 is reached, after which cylinder 104 comes into action by the thrust of the screw. The quantity of hot, article-forming compound accumulated in the point 22A of the injector at a temperature preferably a little below that at the start of vulcanizaion, is thrust through the injection passage 73 (FIG. 5) into the distribution channel 80; in the first instant, because of the narrowness of the orifice 82, the compound fills the whole channel 80, and afterwards is forced under high pressure through this orifice 82 into the moulding cavity 70. Given the rapidity of the injection process (which can be regulated by the feeding of propulsion-screw cylinder 104), the compound thus drawn undergoes an increase of temperature, and reaches the molding cavity 70, having reached, at least substantially, the vulcanization temperature. So that this heating may be uniform, throughout the whole, mass, the narrow construction or orifice 82 is constructed so as to produce a filmy flux of the compound; that is, apart from presenting a considerably reduced cross-sectional thickness $s$ (of the order of 0.15 to 0.2 mm. (.006 to .008 *in.*) in the specific case considered), the orifice 82 presents also, in comparison with such thickness, a considerable radial length M (FIG. 5), which in the specific case considered above, amounts to about 2 mm.; (0.080 inch) and, in general, amounts to 10 to 15 times more than the thickness $s$. The compound heats up, in this way, progressively, and uniformly to the temperature of vulcanization by the effect of the friction heat alone, and once the molding cavity 70 is filled under these conditions, the volume of compound in the cavity no longer tends to increase during the following vulcanization period, and a counterpressure, of such force as to require a powerful means of clamping the die, is therefore no longer required.

Thus, when the injection phase is over, the injector 22 is withdrawn to the position from which its started, and at the same time the clamping cylinder 20 is also operated so that it withdraws its piston rod to the inoperative position (FIG. 4), so that the die-assembly involved descends by gravity on its column 40, in relation to the bracket 16, thus freeing itself from engagement with the latter. At this point the device for step by step advancement, the gear or index means 44 intervenes, which advances the rotating unit in the direction of the arrow F (FIG. 3). Thus, the assembly 46A passes to the next point, indicated as S–2, which begins vulcanization by turning on the heat resistors in the openings 58A–58D of the heating plate 58, while at the injection point S–1, another assembly 46A arrives, on which is repeated the described injection process, and so on for all the other assemblies.

When the assembly 46A comes to the point indicated as S–3, the vulcanization process is completed, and the heat resistors of this assembly are switched off or inactivated. At the next point, S–4, the hydraulic cylinder 62 of the assembly 46A operates in the opening direction, this position being shown in the left part of FIG. 1. The assembly stays open until it reaches point S–6, which comes before in injection point. In the arc between points S–5 and S–6 the operations of the delivery, the treatment of the dies with an agent to detach any residue, the possible insertion of metal plates, etc., may be effectuated. Thus, FIG. 3 shows a means X for removing the sprue left in the opening 78, means Y for removing the completed seal, and means Z for picking up a desired size and shape of stamping from the holder T and feeding it to the die assembly. At the point S–6, the hydraulic cylinder 62 of the assembly is operated in a closing direction, so that, at the next step of the rotating unit, the assembly 46A reaches the injection point S–1, with the piston rod 62A raised above the upper end of the piston rod 20A of the clamping cylinder 20. From this point on, all the operations are repeated in the way already described, it being understood that all the die-assemblies 46 accomplish (and undergo) such operations in sequence.

The distribution of hydraulic or other fluid to the closure cylinders 62, and the distribution of the current to the heat resistors of each heating plate 58 takes place from the shaft 32 of the turntable 38, for example. For such a purpose the shaft 32 forms at the same time as the hub 35 of the rotating unit, a hydraulic or like distribution assembly of the type known to those skilled in the art of such devices, with feed and discharge lines 110 (FIG. 1) applied to the base of the shaft. In the same fashion, an upper part of the shaft 32 combines with an upper part 35A of the hub 35 to form an electric distributor with sliding contacts, for the heating resistors, fed by conductors 111 connected to the electrical terminals. Furthermore, from the lower end of each column 40 of the rotating unit, a cam 112 projects downwards (FIGS. 1 and 4) operating together with one or more micro-switches (not shown) forming an integral part of the stand 30 for the control of the electric feeders of the hydraulic circuits, a digit of the same type cam, or similar operational device 114, can be placed on each of the enclosure cylinders 62 (FIG. 1) to operate with a system of micro-switches 115, forming an integral part of the casing 12, and to control the circuits desired. Although the use of an injector of the type with a screw piston is that preferred, the press along the lines of this invention can also operate with other injection devices known in this field.

The invention has been described with reference to the illustrated embodiments; however, certain other modifications may be made, and normally would be made, to a press of the instant type, if conditions warrant such modifications. Specifically, in the field of oil seal manufacture, the rubber or rubberlike parts of the seal are often formed by compression molding or so-called transfer molding. That is, in some cases, the rubber is forced into the mold by the closure of the mold itself, as is well known in this art. The mass of article-forming material is disposed centrally in the mold in a cavity which is reduced in volume as mold closes; this closure forces or transfers the material into the cavity which has the shape or configuration desired to be formed. In such case, initial transfer may be accomplished under low pressure or force by the closure cylinders or like means, and the last or final stages of transfer may be accomplished by the application of the second or higher pressure brought to bear by the high pressure hydraulic system. The operational principle is the same, however.

In the case of compression molding, a similar situation exists; the last stages of compression may take place under a very high pressure which is not necessary or desirable throughout the entire length of the cycle time necessary to vulcanize or cure the rubber or like product. The present invention is effective for virtually all well known materials from which seals or other articles are formed; the composition of such material is not an important feature of the invention; that is, the chemical composition of the article-forming material not be any particular composition or class of compositions.

Mechanically, the invention has been described by reference to a round turntabe; however, the equivalent thereof in chain or other continuous forms may operate equally well. Likewise, hydraulic operation is preferred; mechanical or pneumatic operation may in some cases be desired.

One principal advantage of this invention is that since each die set operates independently from each of the other sets, it is possible to have all the dies different from each other, or, as is the normal case, have several of them the same but one or more differing from the remainder. In this way, only a die and closure assembly need be provided for a unit which is to be made in moderate quantities, and, thus, for example, when one line is operating, it may produce a variety of different units or articles, no individual article of which would be sufficient economically to justify the operation of a manufacturing line. In such case, the length of injection or other working stroke of the mechanism furnishing the material may be governed by cams, microswitches, or the like, of the type shown at 120 in FIGS. 1 and 4, for example. As long as the injected or molded material is the same, the press will operate in the same manner.

In the illustrated embodiment, the movement of the closure cylinders and that of the injection device were coaxial; however, the molds might be clamped at an angle thereto, may be clamped radially inwardly, or the like. It is obvious that other modifications using the principle of the invention will occur to those skilled in the art of presses, molding machines, and the like, and that such modifications may fall within the scope of the invention.

It will thus be seen that the present invention provides a novel apparatus for producing rubber and like molded articles, having a number of advantages and characteristics, including those hereinbefore pointed out and others which are inherent in the invention.

I claim:

1. An apparatus for making an article having a molded portion from a moldable, article-forming material, said apparatus including a plurality of combination mold mounting and closing assemblies, each of said assemblies including means forming a portion thereof for mounting said assembly, axially movable means for receiving separable mold parts, means for moving at least a portion of said mold part receiving means along a given axis to a closed position of said mold parts and for maintaining said receiving means in said closed position of said mold parts under a first force of a given magnitude, a clamping assembly, said clamping assembly including a frame unit and movable means for exerting a second, higher force on said mold part receiving means, means for carrying said assemblies and means for successively positioning each of said mold mounting and closing assemblies in a position of registry with said clamping assembly, said assembly carrying means and said mounting means cooperating to provide free but limited movement of each of said entire mold mounting and closing assemblies with respect to said positioning means, and means for injecting fluent, article-forming material into said molds when said assemblies are positioned in registry with said clamping means.

2. An apparatus as defined in claim 1 in which said means for moving said portion of said mold part receiving means comprises a fluid-operated piston and cylinder unit.

3. An apparatus as defined in claim 1 in which said means for carrying said assemblies comprises a rotary turntable.

4. An apparatus as defined in claim 1 in which said means for positioning each of said molding and closing assemblies is in the form of a drive mechanism producing intermittent motion of a predetermined extent in said carrying means.

5. An apparatus as defined in claim 1 wherein said movable means for exerting said second, higher force is in the form of a fluid piston and cylinder assembly.

6. An apparatus as defined in claim 1 wherein said assembly carrying means comprises at least one axially extending opening in said carrying means and said mounting means comprises a rod extending axially therethrough, said free but limited movement comprising movement of said rod within said opening.

7. An apparatus as defined in claim 1 in which said mounting means includes portions thereof which engage said carrying means in two different positions of said mounting means, thereby limiting the movement of said assemblies in relation to said carrier.

8. An apparatus as defined in claim 1 which further includes molds associated with each of said mold mounting and closing assemblies, and in which each of said molds includes at least one feed channel therein for said fluent material, said channel communicating between an exterior portion of said mold and a cavity formed within said mold, and in which each of said channels includes an orifice therein of greatly reduced cross-sectional area in relation to the cross-sectional area of the remainder of said channel.

9. An apparatus as defined in claim 1 in which said movable means for exerting said second, higher force is movable along the same axis as said axially movable means for receiving said mold parts.

10. A molding apparatus including a carrier unit, an injector unit for a fluent moldable material, means for indexing a given portion of said carrier unit with said injector, a plurality of sets of mold part holders carried on said carrier unit, said sets of mold part holders being spaced apart from one another and disposed near the periphery of said carrier, a mold part closing assembly including means for moving said holders along a given axis with a first force to a given position wherein mold parts held therein are in a closed position, said mold part closing assembly including a frame portion positioning said mold part holders with respect to each other, said frame portion having means thereon for reception by said carrier, said carrier reception means permitting free but limited movement of said closing assembly with respect to said carrier, and a clamping assembly including a frame unit, means for engaging at least parts of said mold part holders, and means for applying a second, higher force to said holders axially of said given movement axis of said mold part holders.

References Cited

UNITED STATES PATENTS

| | | | |
|---|---|---|---|
| 2,333,056 | 10/1943 | Thoreson et al. | 18—20 I X |
| 2,431,843 | 12/1947 | Swoger | 18—20 I X |
| 3,005,235 | 10/1961 | Patera | 18—20 I X |
| 3,091,810 | 6/1963 | Turner | 18—20 I X |
| 3,173,176 | 3/1965 | Kobayashi | 18—20 I X |
| 3,327,352 | 6/1967 | Osgood | 18—20 I |
| 3,407,443 | 10/1968 | Beebee et al. | 18—20 I X |
| 3,195,186 | 7/1965 | Gauban et al. | 19—43 |
| 3,241,187 | 3/1966 | Novel | 18—43 X |
| 3,323,173 | 6/1967 | Poyner | 18—43 X |
| 3,348,267 | 10/1967 | Novel | 18—43 UX |

FOREIGN PATENTS

| | | | |
|---|---|---|---|
| 1,034,425 | 6/1966 | Great Britain | 18—43 |

J. HOWARD FLINT, JR., Primary Examiner

U.S. Cl. X.R.

18—43, seal ring dig, 36